Nov. 25, 1924.  
P. WADE  
WELDING TORCH  
Filed Sept. 12, 1921
1,516,655
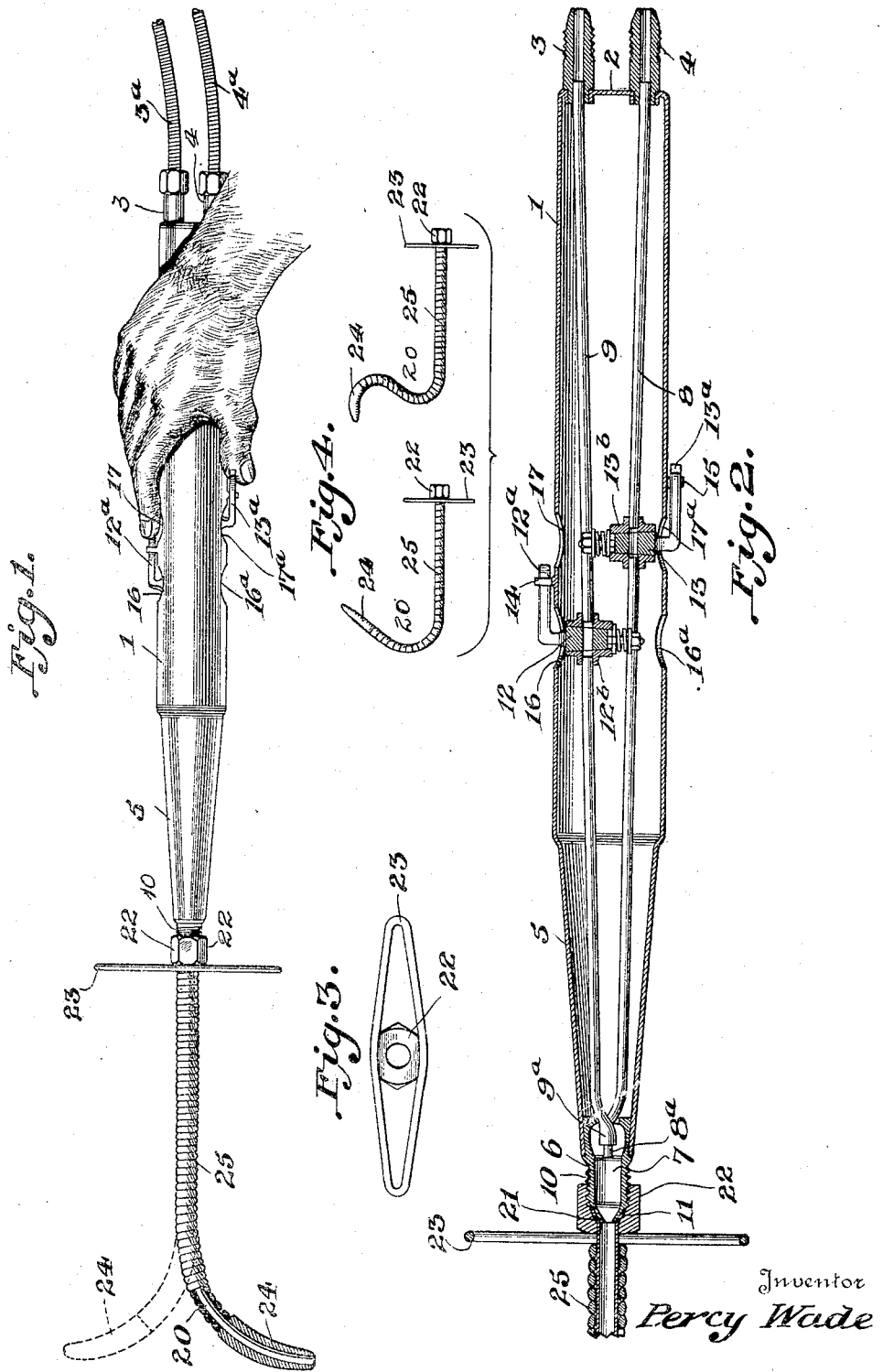
Inventor  
Percy Wade  
By Mason Fenwick & Lawrence  
Attorneys Patented Nov. 25, 1924.

1,516,655

UNITED STATES PATENT OFFICE.

PERCY WADE, OF WASHINGTON, DISTRICT OF COLUMBIA.

WELDING TORCH.

Application filed September 12, 1921. Serial No. 499,922.

*To all whom it may concern:*

Be it known that I, PERCY WADE, a citizen of United States, residing at Washington, in the District of Columbia, have invented certain new and useful Improvements in Welding Torches; and I do hereby declare the following to be a full, clear, and exact description of the invention, such as will enable others skilled in the art to which it appertains to make and use the same.

This invention relates to welding torches intended to apply the oxy-acetylene flame for locally heating metal to be welded.

The objects of the invention are to facilitate the manipulation of a welding torch by placing the supply of the combustible gas and the supporter of combustion under the immediate control of that hand of the welder that grasps the handle of the torch while holding it in position to apply the flame; by enabling the tip to be angularly adjusted about the axis of the handle so that the position of a deflected tip may be changed without bringing the hand into an awkward position or shifting the handle so that the controlling valves cannot be conveniently manipulated; by providing a long tip of flexible material which may be bent into various contours and thus adapted to apply the flame to places otherwise difficult of access; to enable the tip to be instantly removed and replaced without the use of tools, and for other purposes.

The invention consists in the combination of parts more particularly set forth in the ensuing description, defined in the appended claim and illustrated in the accompanying drawings.

In the accompanying drawings in which similar reference characters indicate similar parts throughout the several views:

Fig. 1 is an elevation of the improved torch;

Fig. 2 is a longitudinal section through the torch handle and a portion of the tip;

Fig. 3 is an end view of a handled coupling by which the tip is secured to the torch handle;

Fig. 4 shows a flexible insulated tip adapted to be bent into various forms.

In the drawings, numeral 1 indicates a torch handle which may be hollow and may be drawn from metal tubing or otherwise made from suitable material. The rear end 2 of said torch is closed and has projecting therefrom in parallel relation a nipple 3, adapted to be connected by means of a pipe $3^a$ with a supply of oxygen, and a nipple 4, adapted to be connected by a pipe $4^a$ with a supply of acetylene or other combustible gas. The forward portion of the handle 1 is tapered, as indicated at 5. To the extremity of the tapered portion a hollow member 6 is soldered or otherwise secured. Said member 6 encloses a mixing chamber 7 into which an acetylene conduit 8 and an oxygen conduit 9 discharge, said conduits extending through the hollow handle from the nipples 4 and 3 respectively. As shown, the oxygen conduit 9 is enlarged at its extremity $9^a$ and the acetylene conduit 8 enters and extends through the enlargement so that the oxygen conduit discharges an annular stream of gas around the end $8^a$ of the acetylene conduit into the mixing chamber. The member 6 is threaded exteriorly at 10 and has a smooth frusto-conical tip 11 perforated at its end. Flow of oxygen through the pipe or conduit 9 may be controlled by a valve 12 and flow of acetylene through the pipe or conduit 8 by a valve 13. These valves may be rotary valves such as tapered turning plugs having diametrical openings therethrough, seated in valve casings $12^b$, $13^b$ of ordinary type, which may be soldered or otherwise connected with the conduits or pipes. Each of said valves is provided with a spring tending to draw the valve into its seat. The valve 12 is provided with a laterally extending handle $12^a$ and the valve 13 with a laterally extending handle $13^a$. On the outside of handle 1 are stops 14 and 15. When the valve handle $12^a$ is against the stop 14, the valve 12 is closed and when the handle $13^a$ is against the stop 15, the valve 13 is closed. Diametrically opposite the valve 12, holes 16 and $16^a$ are formed in the handle 1 and diametrically opposite the valve 13 are holes 17, $17^a$ in said handle. The valve handle $12^a$ projects through the hole 16 and the valve handle $13^a$ projects through the hole $17^a$. These holes are of greater diameter than the valves and enable valves to be inserted or removed through them and admit a tool for tightening or loosening. They also provide ventilation for the interior of the handle. The said valves are located a sufficient distance forward of the rear end of the handle to afford plenty of room for the hand of the operator to grasp the handle rearward of the valves. Said valves are also adjacent each other but are longitudinally spaced apart such a distance that the valve handles 12ª and 13ª are disposed so that they can be conveniently manipulated by the thumb and forefinger of an operator's hand grasping the handle.

The tubular member 20 projecting forward from the member 6, I call the tip. The tip 20 is made of tubular material sufficiently flexible to be bent into any desired form and of sufficient rigidity to hold the form into which it has been bent. In practice I prefer to make this tip of copper tubing, the rear end 21 of which is expanded into frusto-conical form of such pitch and dimensions as to fit nicely over the frusto-conical end 11 of the member 6. Sleeved over the tip 20 and engaging the outside of the expanded end 21 is a union coupling nut 22, the threads on the interior of which are adapted to engage with the threads 10 of the member 6 and draw the tip 20 into fluid-tight engagement with the end 11 of the member 6 so that the tip constitutes a fluid-tight conduit projecting from the mixing chamber 7. The union coupling 22 is provided with wings or laterally projecting handles or arms 23 which, as shown, may consist of a wire body tapering in opposite directions from the nut and passing each side of the opening therethrough. The wings or arms 23 may be made of poor conducting material, and, being of open construction remain sufficiently cool in practice to enable the coupling to be manipulated by the naked hand while the tip is hot.

The tip 20 is preferably heat-insulated. The extremity may be covered with any suitable insulating material 24 adapted to be molded on, while the body of the tip 20 should be covered by a flexible insulation 25, such as a wound-on strand of asbestos packing.

This torch is particularly handy and convenient for a welder as he may control the proportions of acetylene or other combustible gas and oxygen while holding the flame upon the metal to be heated, thereby saving the time consumed in withdrawing the tip of the torch in order to operate the valves which control the gas supply. The winged or handled coupling enables a tip to be instantly removed at any time without the use of wrenches. Different types of tips may therefore be quickly applied without material loss of time. The flexibility of the tip enables it to be changed in shape so that flame may be applied to places difficult of access, and because of the flexible insulated coating on the tip, this change may be made quickly without removing the tip from the handle. The winged coupling also enables a curved tip or tip having a deflected end to be quickly rotated and adjusted to a new position, as for example, when welding the seam of a vessel which requires the torch ordinarily to be rotated in following the seam around the inside. Thus, the position of the tip may be shifted around the axis of the handle while still leaving the handle in convenient position so that it can be manipulated to the best advantage with the valves for controlling the supply of gases in most convenient position with respect to the thumb and finger of the hand grasping the handle.

Having described my invention in such manner as to enable those skilled in the art to make and use the same, what I claim and desire to secure by Letters Patent is:

In a welding torch, the combination of a torch handle, a mixing chamber and a tip, separate gas conduits entering said handle and discharging into said mixing chamber, a valve for each conduit, said valves being separated longitudinally of the handle, said handle having diametrically opposite holes adjacent the valves and of greater diameter than the valves, and a valve handle on each valve disposed in position to be manipulated by the thumb and finger of a hand grasping the torch handle the valve body proper being contained within the handle.

In testimony whereof I affix my signature.

PERCY WADE.